(12) United States Patent
Fedi et al.

(10) Patent No.: US 9,091,483 B2
(45) Date of Patent: Jul. 28, 2015

(54) PROCESS FOR PURIFYING A FLOW OF COMBUSTION FUMES FROM A CLINKER PRODUCTION PLANT AND RELATIVE APPARATUS

(75) Inventors: Roberto Fedi, Bergamo BG (IT); Antonio Clausi, Bergamo BG (IT); Giovanni Cinti, Bergamo BG (IT)

(73) Assignee: ITALCEMENTI S.P.A., Bergamo BG (IT)

(*) Notice: Subject to any disclaimer, the term of this patent is extended or adjusted under 35 U.S.C. 154(b) by 260 days.

(21) Appl. No.: 12/998,992

(22) PCT Filed: Dec. 17, 2009

(86) PCT No.: PCT/IB2009/007818
§ 371 (c)(1),
(2), (4) Date: Sep. 8, 2011

(87) PCT Pub. No.: WO2010/073089
PCT Pub. Date: Jul. 1, 2010

(65) Prior Publication Data
US 2011/0318247 A1    Dec. 29, 2011

(30) Foreign Application Priority Data
Dec. 23, 2008   (IT) .............................. MI2008A2310

(51) Int. Cl.
*F23J 15/02*        (2006.01)
*F23G 5/02*         (2006.01)
(Continued)

(52) U.S. Cl.
CPC .............. *F27D 17/004* (2013.01); *C04B 7/364* (2013.01); *C04B 7/436* (2013.01); *F23G 5/02* (2013.01); *F23J 15/02* (2013.01); *F27B 7/2033* (2013.01); *F27D 17/008* (2013.01); *C04B 2/10* (2013.01);
(Continued)

(58) Field of Classification Search
None
See application file for complete search history.

(56) References Cited

U.S. PATENT DOCUMENTS 3,781,408 A * 12/1973 Lin .......................... 423/244.07
3,989,482 A * 11/1976 Ritzmann et al. .................. 95/3
(Continued)

FOREIGN PATENT DOCUMENTS

DE    43 13 479 C1    6/1994
EP    0 461 305 A     12/1991
(Continued)

OTHER PUBLICATIONS

PCT Search Report dated Jun. 9, 2010.
(Continued)

*Primary Examiner* — Melvin C Mayes
*Assistant Examiner* — Sheng H Davis
(74) *Attorney, Agent, or Firm* — Hedman & Costigan, P.C.; James V. Costigan; Kathleen A. Costigan

(57) ABSTRACT

The present invention concerns a process for purifying a flow of combustion fumes from a clinker production plant comprising the following operating steps: a) removing dust at a temperature comprised between 250 and 400° C. from a flow of combustion fumes exiting from a suspension preheater with formation of a flow of combustion fumes free of dust; b) carrying out on said flow of combustion fumes free of dust a selective catalytic $NO_x$ reduction treatment with a reducing agent, with formation of a purified flow of combustion fumes. The present invention also concerns an apparatus for carrying out the aforementioned process.

7 Claims, 2 Drawing Sheets

Figure 1B:
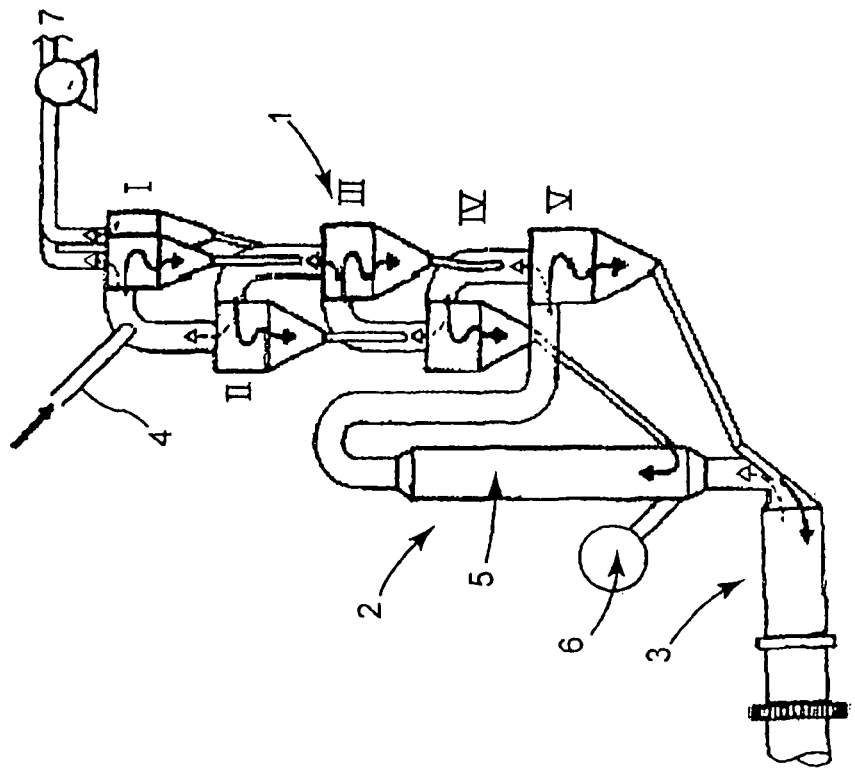

(51) Int. Cl.
*F23J 1/00* (2006.01)
*C04B 2/10* (2006.01)
*C04B 7/36* (2006.01)
*F27B 7/20* (2006.01)
*F27D 17/00* (2006.01)
*C04B 7/43* (2006.01)

(52) U.S. Cl.
CPC .............. *F23J 1/00* (2013.01); *F23J 2215/00* (2013.01); *F23J 2217/10* (2013.01); *F23J 2217/40* (2013.01); *F23J 2217/50* (2013.01); *F23J 2219/10* (2013.01); *F23J 2219/60* (2013.01)

(56) References Cited

U.S. PATENT DOCUMENTS

| | | | | |
|---|---|---|---|---|
| 4,326,845 A | * | 4/1982 | Hess | 432/106 |
| 4,695,325 A | * | 9/1987 | Enkegaard | 106/752 |
| 7,384,615 B2 | * | 6/2008 | Boardman et al. | 423/244.07 |
| 7,553,155 B2 | * | 6/2009 | Erpelding et al. | 432/58 |
| 2002/0071801 A1 | * | 6/2002 | Eckert et al. | 423/244.07 |
| 2004/0042946 A1 | * | 3/2004 | Vicard | 423/215.5 |
| 2005/0008546 A1 | | 1/2005 | Kobayashi | |

FOREIGN PATENT DOCUMENTS

| | | |
|---|---|---|
| JP | 53-040012 A | 4/1978 |
| JP | 53040012 * | 4/1978 |
| WO | WO 2005/108891 A | 11/2005 |

OTHER PUBLICATIONS

Database WPI Week 197821, Thomson Scientific. L:ondon, GB AN 1978-37328A XP002551571.

* cited by examiner

PROCESS FOR PURIFYING A FLOW OF COMBUSTION FUMES FROM A CLINKER PRODUCTION PLANT AND RELATIVE APPARATUS

The present invention concerns a process for purifying a flow of combustion fumes from a clinker production plant and the relative apparatus.

Cement is a hydraulic binder used to bind inert solid materials, like sand and gravel, thus forming concrete and mortar, i.e. the base components for building.

On the industrial scale, cement is made through mixing and grinding of clinker and gypsum with corrective substances like lime, slag and pozzolana.

In the process for producing cement according to what is known as "dry" technology, the clinker is obtained by high temperature baking of a mixture of raw materials consisting mainly of lime (calcium carbonate) and clay (silica, alumina, iron oxides, as well as crystallization water). The raw materials are mixed in solid state in the desired proportions and then finely ground until a homogeneous powder known as "raw meal" (or "raw mixture") is obtained. In the present description, by "raw meal" or "raw mixture" we thus mean the homogeneous dust thus obtained used as starting material for producing clinkers.

The raw meal is transformed into a clinker by means of baking at a temperature of about 1450° C. in a rotary kiln essentially consisting of an inclined rotary cylinder.

During its transit in the rotary kiln, the raw meal is heated up to temperatures of about 1450° C. During heating the meal firstly undergoes complete calcining and, thereafter, reacts forming the calcium silicates and aluminates (clinkering reaction) that represent the main constituents of the clinker. More specifically, during the clinkering reaction there are a series of chemical reactions between calcium oxide, silicon oxide, aluminum oxide and iron oxide, said reactions being encouraged by the melting of a part of the raw materials themselves (aluminum and iron oxides).

The energy necessary to make the clinkering reaction take place is produced by means of a burner positioned on the head of the rotary kiln, at the opposite end with respect to that in which the meal is loaded. The fuels generally used are coal, petcoke, fuel oil, methane, as well as alternative fuels like, for example, meat meals.

The heat energy is transmitted to the raw meal subjected to treatment by irradiation in the baking area at the burner (temperature of about 2000° C.) and by convection and conduction by means of the combustion gases in the remaining part of the kiln.

At the end of the baking treatment, the clinker thus obtained is discharged from the rotary kiln and is quickly cooled in an air cooler in order to stabilize it.

Figure 1A:
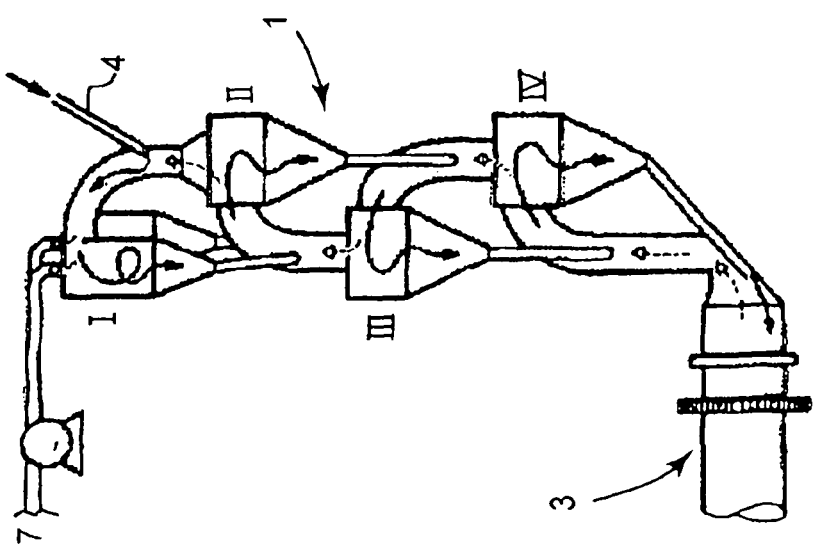

The processes according to the state of the art are represented and discussed with reference to the following figures:

FIG. 1A, which shows a schematic representation of a clinker production plant according to the state of the art comprising a rotary kiln equipped with a 4 stage suspension preheater;

FIG. 1B, which shows a schematic representation of a clinker production plant according to the state of the art comprising a rotary kiln equipped with a 5 stage suspension preheater and a precalciner.

In the aforementioned figures the full lines indicate the flows of solid material, the dashed lines indicate the gaseous stream flows, whereas the Roman numerals indicate the stages of the suspension preheaters.

In clinker production plants known in the state of the art, the raw meal, before being fed to the rotary kiln, is subjected to a preheating and, optionally, precalcining treatment.

One of the currently most widely used preheating techniques is based on the use of the so-called "suspension preheater" or "multi-stage cyclone preheater" (hereafter also just "preheater"), consisting of a cyclone tower in which each preheating stage takes place in one or more cyclones.

In such a type of preheater, by first cyclone we mean the cyclone in which the first preheating stage and the first separation between preheated meal and combustion fumes take place, by second cyclone we mean the cyclone in which the second preheating stage and the second separation between preheated meal and combustion fumes take place and the subsequent cyclones of the multi-stage cyclone preheater are analogously defined. In the present description, the first cyclone of the preheater, just like the subsequent cyclones, should always be interpreted according to the above definition.

The first stage, unlike the subsequent ones, is configured to minimize the carrying of dust by the combustion fumes from the kiln. Despite this, the concentration of dust in the combustion fumes exiting the preheater stays high (around 50-100 $g/Nm^3$).

The preheating and precalcining steps are carried out, respectively, in the preheater 1 and in the precalciner 2 (FIGS. 1A and 1B). The presence of these steps allows the partially calcined (30-40%) meal that has been preheated to a temperature of about 950° C. to be fed to the rotary kiln 3, with a substantial energy saving in the subsequent clinkering reaction.

The presence of the preheating step, optionally accompanied by the precalcining step, also allows rotary kilns of reduced size to be used, thus reducing the heat losses that occur in such kilns and increasing the overall energy efficiency of the clinker production process.

In the preheater, the starting raw meal is gradually brought from the temperature of 40° C. to about 950° C. The heating is carried out keeping the meal in suspension in a flow of hot gases, consisting of the combustion fumes of the rotary kiln and optionally the combustion fumes of the precalciner, exploiting the large heat exchange surface between the meal and the gaseous phase.

In the preheating step the amount of time for which the solid phase (meal) is in contact with the gaseous phase (combustion fumes of the rotary kiln) is of fundamental importance. In order to ensure an optimal contact time between the solid phase and the gaseous phase, the suspension preheater consists of a series of cyclones (from 4 to 6) arranged one on top of the other to form a tower of variable height even up to 130-150 m. Such a preheater can be defined as a multi-stage cyclone preheater. The first preheating stage, which occurs at the top of the tower, can be carried out in two cyclones in parallel to ensure better efficiency of separation of the meal from the gaseous flow before it exits the preheater.

With reference to FIG. 1A, in the multi-stage cyclone preheater 1 the combustion fumes from the rotary kiln 3 and having a temperature of about 900-1000° C. pass through the cyclones from the bottom towards the top (from IV to I). The starting raw meal is mixed with the combustion fumes in the preheater 1, inside which it is inserted through an inlet 4, arranged at the top of the preheater, between the first (I) cyclone and the second (II) cyclone. The raw meal passes through the preheater up to the outlet in the lower part, transported from one cyclone to the next by the flow of combustion fumes. In each cyclone about 80% of the solid phase (meal) is separated from the gaseous phase (combustion fumes) to then be inserted once again in the gaseous phase entering into the cyclone below. The gaseous phase containing the remaining solid fraction (about 20% of the meal), on the other hand, flows to the next cyclone above.

At the bottom of the preheater 1, a preheated meal is obtained having a temperature of about 950° C. From the last preheating stage in the multi-stage cyclone preheater, the meal is discharged directly into the rotary kiln 3 for the subsequent clinkering reaction.

In plants equipped with a precalciner 2 (FIG. 1B), the preheated meal is fed from the preheater 1 to a suitable combustion chamber 5, equipped with a burner 6, inside which it undergoes a partial calcining process. The precalcined meal leaves the precalciner 2 and is fed, together with the combustion fumes of the precalciner 2, to the last stage (V) of the preheater 1 to then proceed towards the rotary kiln 3. The combustion fumes of the precalciner 2 flow together with those of the rotary kiln 3 and climb the preheater 1 up to the top outlet 7, after the first cyclone.

The gaseous flow exiting through the outlet 7 of the preheater, comprising the combustion fumes of the rotary kiln 3 and, optionally, those of the precalciner 2, has a temperature of about 270-360° C.

In clinker production plants according to the state of the art, before being released into the atmosphere, this flow is generally used in other steps of the cement production process (for example, for the grinding and drying of the raw materials or else as combustion air in the rotary kiln or in the precalciner) to recover its heat content.

The preparation of the clinker in a cement production plant like the one described above generates enormous volumes of gaseous emissions, which can potentially pollute the environment.

The gaseous flow exiting the preheater is characterized by a high concentration of polluting substances, in particular nitrogen oxides ($NO_x$) and dusts.

The $NO_x$ derive mainly from the combustion processes that take place in the rotary kiln and, optionally, in the precalciner. The main techniques currently used to reduce the $NO_x$ in the gaseous flow exiting the preheater are the following two:

Selective Non-Catalytic Reduction (SNCR) that foresees the reaction of the $NO_x$ with a reducing agent (for example ammonia or urea) in the high temperature area of the preheater;

Selective Catalytic Reduction (SCR) that foresees the reaction of the $NO_x$ with $NH_3$ as reducing agent in the presence of a catalyst.

The SNCR technique is effective if used on a gaseous flow having a temperature of 800-900° C. and allows most of the $NO_x$ present to be reduced.

The application of the SCR technique, only recently used in the field of electrical energy production and in the development phase in the field of cement, allows very high reduction yields (over 90%) to be achieved. The SCR technique is effective if used on a gaseous flow having a temperature of between about 300 and 400° C.

Considering this optimal temperature range for the reduction of the $NO_x$, the SCR device is installed in clinker production plants immediately downstream of the preheater with respect to the flow direction of the combustion fumes.

At the outlet of the preheater, after the first cyclone stage, the combustion fumes are at a temperature of about 270-360° C. and contain large amounts of $NO_x$ (>1 $g/Nm^3$) and of dust 50-100 $g/Nm^3$.

Such a $NO_x$ reduction technique applied to clinker production plants is generally indicated in literature by the term "high dust-SCR", since the $NO_x$ reduction is carried out on a gaseous effluent without the dust removed.

The application of this technique has various drawbacks linked mainly to the presence of large amounts of dust in the combustion fumes exiting the preheater. The dust, depositing on the surface of the catalyst, reduces the efficiency of the reduction system SCR, at the same time increasing the resistance to the passage of the gaseous flow and therefore the energy consumption linked to its movement.

The presence of dust in the treated gaseous effluent also means high energy consumption associated with the need to clean the catalyst with compressed air, as well as reducing the useful life of the catalyst due to the abrasive action that the dust exerts on the surface of the catalytic bed. The high presence of dust is linked essentially to the limited efficiency of dust removal of the cyclones that make up the preheater. Although they are designed to maximize the separation efficiency, the cyclones are only able to effectively separate heavier dust.

A second drawback of the high dust-SCR technique is represented by the fact that in the combustion fumes exiting the preheater there can also be ashes, generated by the combustion in the burners of the rotary kiln and of the precalciner of alternative fuels, like for example meat meals. The presence of ash (containing phosphates) causes the catalyst to be poisoned and its effectiveness in the $NO_x$ reduction to be consequently decreased.

Sometimes in the fumes there are sulphur oxides, mainly in the form of $SO_2$, depending on the sulphur content of the raw materials used.

The $SO_2$ reduction in these cases can be carried out by means of injection of calcium oxide- and/or calcium hydroxide-based compounds in the combustion fumes, with consequent formation of calcium sulphate, said calcium sulphate advantageously being able to be recycled in the clinker production process. The efficiency of reduction of the sulphur oxides in gaseous phase according to the aforementioned technique is also limited by the presence in the fumes of high concentrations of dust, which make it almost impossible to recycle unreacted lime.

An alternative to the high dust-SCR purification technique described above is the "low dust-SCR" technique. This technique foresees the reduction of the $NO_x$ by means of SCR on combustion fumes that have already had dust removed by means of filtering. The filtering of the combustion fumes substantially reduces the dust content, to values of around 5-10 $g/Nm^3$, avoiding clogging of the catalyst and the consequent management problems of the selective catalytic $NO_x$ reduction process.

In plants that adopt the low dust-SCR technique, the $NO_x$ reduction is carried out as an "end of pipe" technique, i.e. as the last treatment stage of the combustion fumes, before they are released into the atmosphere.

End-of-pipe application is currently considered to be the only possible way of using the low dust-SCR technique in clinker production plants. In almost all of these plants, indeed, the technique for removing dust from the combustion fumes that is used is filtering on fabric filters, these being the only devices capable of ensuring the low emission levels of dust set by the current environmental standards.

However, fabric filters can only operate in a limited temperature range. Whilst varying according to the type of fabric used, the operating temperature never exceeds 250° C. The use of the low dust-SCR technique, therefore, requires the installation of suitable systems for reducing the temperature of the gaseous effluents to be filtered (for example, conditioning towers, heat exchangers, diluting air insertion) with a consequent increase in the investment costs for the plants and in the overall energy consumption of the process for purifying the combustion fumes.

Moreover, since the selective catalytic reduction stage, which follows the filtering of the dust, requires that the temperature of the gaseous effluent treated be within the range 300-400° C. in order to carry out an effective $NO_x$ reduction, it is necessary to heat up the combustion fumes free from dust, before feeding it to the reducer SCR. This of course means a further increase in energy consumption of the purification process.

All of these drawbacks have up to now prevented the application of a promising technique like low dust-SCR in the field of the purification of combustion fumes from clinker production plants.

The purpose of the present invention is to overcome the drawbacks highlighted by the state of the art.

Therefore, a first object of the present invention is a process for purifying a flow of combustion fumes from a clinker production plant comprising the following operating steps:
a) removing dust at a temperature comprised between 250 and 400° C. from a flow of combustion fumes exiting from a suspension preheater with formation of a flow of combustion fumes free of dust;
b) carrying out on said flow of combustion fumes free of dust a selective catalytic $NO_x$ reduction treatment with a reducing agent, with formation of a purified flow of combustion fumes.

A second object of the present invention is an apparatus for carrying out a process of purification of a flow of combustion fumes from a clinker production plant comprising:
i) means for removing dust at a temperature comprised between 300 and 400° C. from a flow of combustion fumes exiting from a suspension preheater with formation of a flow of combustion fumes free of dust;
ii) means for carrying out a selective catalytic $NO_x$ reduction treatment with a reducing agent on a flow of combustion fumes free of dust with formation of a purified flow of combustion fumes, said means for carrying out said treatment being connected to the dust removal means from which they receive a flow of combustion fumes free of dust.

For the purposes of the present invention by the term "combustion fumes" we mean the gaseous flow used inside a suspension preheater to preheat the raw meal, said gaseous flow comprising the combustion fumes exiting a baking kiln of the clinker and, optionally, the combustion fumes exiting a pre-calciner, if present.

Figure 2:
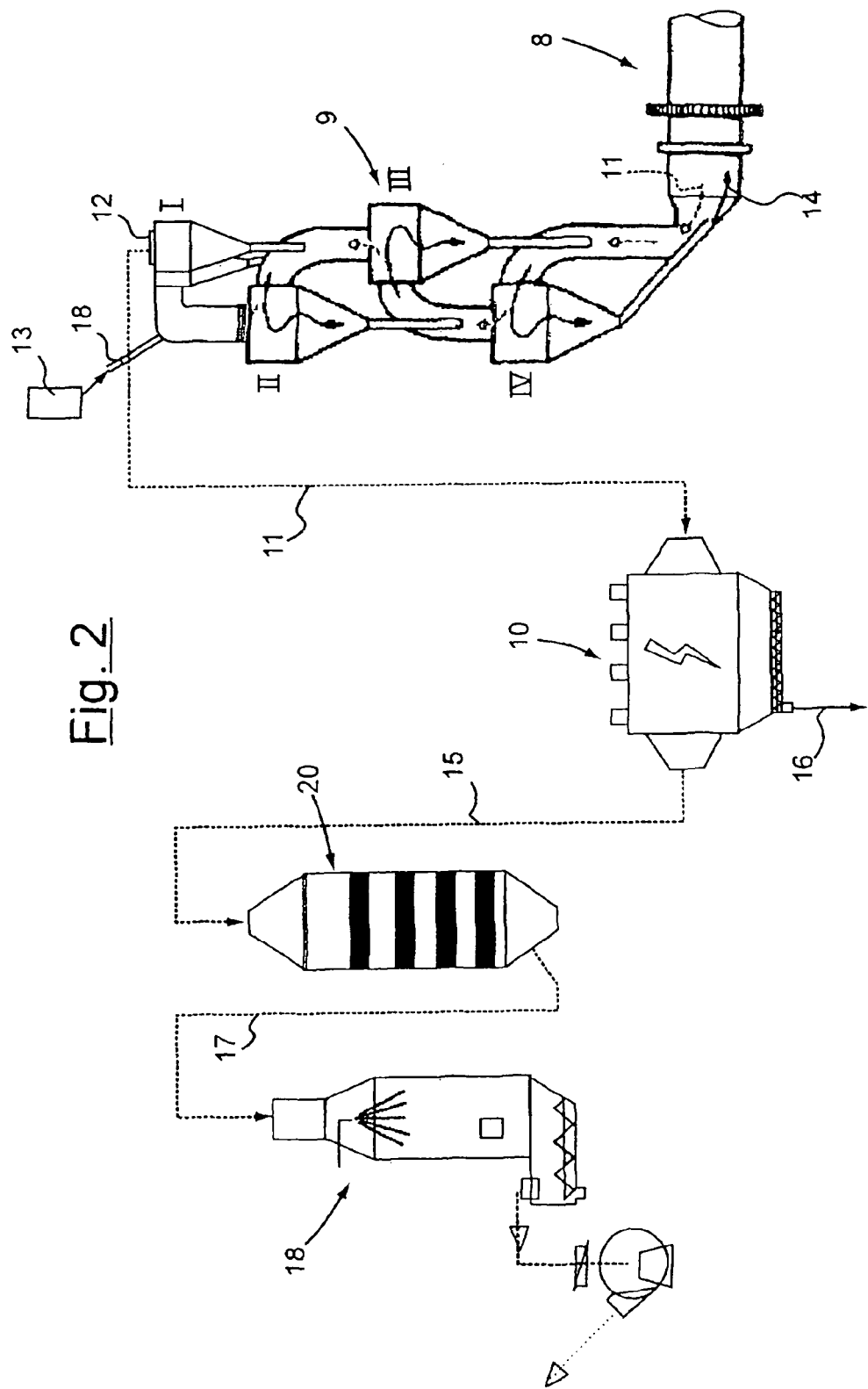

A preferred embodiment of the process and of the apparatus according to the present invention is schematically represented in the attached FIG. 2.

In FIG. 2 also the full lines indicate the flows of solid material, the dashed lines indicate the flows of gaseous streams, whereas the Roman numerals indicate the cyclones of the suspension preheater.

In the embodiment of the process illustrated in FIG. 2 a flow of combustion fumes 11, from a rotary kiln 8, flows from the bottom towards the top in a multi-stage cyclone preheater 9 up to an outlet 12 arranged at the top of the preheater 9.

The starting raw meal 13 is inserted into the preheater 9 through an inlet 18 arranged between the first (I) cyclone and the second (II) cyclone. In the preheater 9 the raw meal 13 mixes with the combustion fumes 11 staying in suspension in the gaseous phase and, at the same time, heating up. The raw meal 13 runs through the preheater 9 from the top towards the bottom, in the opposite direction with respect to the ascending flow of the flow of combustion fumes 11. At the end of preheating, the preheated raw meal 14, which is at a temperature of about 950° C., is discharged from the bottom of the preheater 9 into the rotary kiln 8 where it is subjected to the subsequent clinkering reaction.

The flow of combustion fumes 11 exiting the outlet 12 of the preheater 9 is fed to step a) of the process according to the present invention. In step a) the flow 11 is subjected to dust removal at a temperature of between 250 and 400° C., preferably between 270 and 360° C. These temperature ranges are those generally encountered for a flow of combustion fumes exiting the head of a 4-6 stage cyclone suspension preheater.

In the embodiment illustrated in FIG. 2 the dust removal of the flow of combustion fumes 11 exiting the preheater 9 is carried out with the electrostatic precipitation technique. For this purpose the apparatus according to the present invention comprises an electrofilter 10. The electrofilter 10 allows the flow of combustion fumes 11 at a high temperature (250-400° C.) to be freed from dust, thus avoiding the cooling operations of the gaseous flow that are, however, essential in the case of filtering over fabric filters.

For the purposes of the present invention, instead of electrostatic precipitation, it is possible to use any other filtering technique that is suitable for removing dust from the combustion fumes exiting the preheater at the same operating temperatures of an electrofilter.

In step a) of the process according to the present invention a flow of combustion fumes free of dust 15 and a dust residue 16 essentially comprising partially preheated raw meal are formed. The raw meal thus recovered can be recycled within the clinker production process, for example, inserting it once again in the preheater 9 through the inlet 18.

Irrespective of the means used to carry out step a), the dust removal of the flow of combustion fumes 11 in step a) reduces the concentration of dust in the flow of combustion fumes free of dust 15 to a value below 15 g/Nm$^3$, more preferably below 10 g/Nm$^3$, even more preferably below 5 g/Nm$^3$.

In the subsequent step b) of the process according to the present invention on the flow of combustion fumes free of dust 15 a selective catalytic reduction treatment (SCR) is carried out by means of reducing agents (for example, ammonia). The SCR treatment can be carried out by means of a suitable selective catalytic reduction device (SCR device 20 in FIG. 2), according to the methods known in the state of the art. The reducing agent can be fed into the gaseous flow inside the SCR device. Alternatively, the ammonia possibly present in the same flow of combustion fumes subjected to the SCR treatment can be used as reducing agent. This ammonia derives from the heat treatment of the raw materials fed to the preheater and it is transported by the combustion fumes through the electrofilter up to the catalyst of the SCR device. If the amount of ammonia deriving from the raw materials is not sufficient, it is possible to feed an additional amount of ammonia or other reducing agent into the gaseous flow.

During the SCR treatment of step b), the $NO_x$ are converted into $N_2$ and steam. From the reducer 20 at the end of step b) a purified flow of combustion fumes 17, substantially free from dust and $NO_x$ comes out.

In a preferred embodiment, the process according to the present invention also comprises a further step c) consisting of subjecting the purified flow of combustion fumes 17 exiting the SCR reducer 20 to one or more treatments for removing further pollutants and/or to a heat recovery.

For this purpose the apparatus object of the present invention foresees the presence of suitable treatment means for purifying the pollutants and/or heat recovery means.

A first purification treatment to which it is possible to subject the purified flow of combustion fumes 17 is a reduction process of the sulphur oxides (desulphuring), in particular for reducing $SO_2$. Preferably, this process foresees the injection of calcium oxide- and/or calcium hydroxide-based compounds into the flow of purified combustion fumes 17, by means of a suitable injection device. The aforementioned desulphuring process (not shown in FIG. 2) can be carried out without distinction before or after having subjected the purified flow of combustion fumes 17 to a heat recovery step.

In order to recover the heat of the flow of combustion fumes exiting the SCR reducer 20, the flow 17 can be fed to other steps of the clinker production process or, more generally, to other steps of the cement production process (for example, in the grinding and drying of the raw materials or else as combustion air in the rotary kiln and/or in the precalciner).

Alternatively, the residual heat of the purified combustion fumes 17 can be recovered using suitable heat recovery means. For this purpose, the apparatus according to the present invention can, for example, comprise a heat exchanger of the air/air, air/diathermal oil, air/water-steam type or else a water-operated conditioning tower (conditioning tower 18 in FIG. 2).

The process according to the present invention can also be applied in clinker production plants equipped with a precalciner. In this case, the combustion fumes of the rotary kiln are fed to the precalciner and from here, together with the combustion fumes of the precalciner, to the suspension preheater 9.

The process and the apparatus according to the present invention can be applied both to existing clinker production plants and to new plants.

The process according to the present invention and the relative apparatus have various advantages with respect to the processes and apparatuses known in the state of the art.

Firstly, the process according to the present invention makes it possible to effectively apply the low dust-SCR technique to purify the combustion fumes of a clinker production process, avoiding the drawbacks highlighted by the state of the art.

The plant and process according to the present invention, carrying out the high-temperature dust removal of the combustion fumes exiting the preheater, allow a gaseous effluent free from dust to be subjected to the subsequent purification treatment of $NO_x$ and, optionally of other pollutants, with a series of important advantages.

The low dust content in the combustion fumes subjected to the selective catalytic $NO_x$ reduction treatment makes it possible:
- to obtain high $NO_x$ reduction efficiencies, at the same time improving the reliability and the continuity of operation of the SCR reducer;
- to decrease the maintenance interventions of the SCR system due to clogging of the catalyst, poisoning, etc.;
- to reduce the occurrence of load losses of the flow of combustion fumes that passes through the catalyst and, therefore, the energy consumption linked to moving it;
- to substantially reduce the consumption of compressed air necessary for cleaning the catalyst;
- to extend the useful life of the catalyst following the reduced abrasive action of the dust;
- to use a smaller sized catalyst, with consequent decrease in the bulk and costs of the SCR system;
- to substantially reduce the typical problems of dirtying of the heat exchangers, in the case in which these devices are used to recover the residual heat energy of the combustion fumes exiting the SCR treatment.

Moreover, in the case in which alternative fuels are used in the clinker production process, the electrofilter ensures the reduction of the possible ashes produced (typically containing phosphates) that can cause the catalyst to be poisoned. A further advantage of the present invention is, therefore, to make the use of SCR technology compatible with the use of any type of alternative fuels.

The following example embodiment is provided merely for the purpose of illustrating the present invention and should not be taken to limit the scope of protection defined by the attached claims.

EXAMPLE 1

An apparatus according to the present invention comprising a 4 stage cyclone suspension preheater, an electrofilter and a $NO_x$ reduction system was tested.

A flow of combustion fumes from a suspension preheater and having a temperature of 350° C. and a dust concentration of about 70 g/Nm$^3$ was subjected to dust removal in an electrofilter operating at the same temperature. The flow of combustion fumes free of dust at the outlet of the electrofilter had a dust concentration of about 5 g/Nm$^3$.

The purified combustion fumes exiting the electrofilter were subjected to a selective catalytic reduction treatment in an SCR device. The selective catalytic reduction was carried out at a temperature of about 320° C., in the presence of $NH_3$ as reducing agent (100-150 mg/Nm$^3$, value referring to the anhydrous fumes and to 10% in volume of $O_2$). Ammonia was present in the combustion fumes, since it derives from the raw materials.

The purified combustion fumes exiting the electrofilter and fed to the SCR device had a dust (meal) concentration of about 5 g/Nm$^3$ and a temperature of about 350° C. In the combustion fumes there was also a high concentration of $SO_2$ (100-200 mg/Nm$^3$, value referring to the anhydrous fumes and to 10% in volume of $O_2$).

In the testing the $NO_x$ reduction efficiency, the electrical energy consumption for the cleaning with compressed air of the catalyst, the load losses caused by the clogging of the catalyst, how long the catalyst lasts and the occurrence of operating problems of the rotary kiln were evaluated.

The results obtained in the testing of the aforementioned apparatus (indicated in table 1 as "Apparatus present invention") are shown in the subsequent table 1 together with the data relative to an SCR treatment of combustion fumes from a clinker production plant of the conventional type (indicated in table 1 as "Conventional apparatus"). In the conventional apparatus the combustion fumes subjected to SCR treatment came from a 5 stage cyclone suspension preheater and they had a temperature of about 310° C. The concentration of dust in the fumes treated in the SCR system was greater than 70 g/Nm$^3$. In the combustion fumes of the conventional apparatus there were also small concentrations of $NH_3$ and $SO_2$ deriving from the raw materials. Further $NH_3$ was then added to the treated gaseous flow to drive the SCR process in conditions as close as possible to those of the apparatus according to the present invention.

TABLE 1

| Parameter | Unit | Apparatus present invention | Conventional apparatus |
|---|---|---|---|
| Temperature | ° C. | 320 | 310 |
| $NO_x$ reduction efficiency | % | 99 | >90 |
| Cleaning system | kWh/t$_{clinker}$ | 0.2 (discontinuous) | 2 (continuous) |
| Life of the catalyst | — | >5 years | 3-5 years |

TABLE 1-continued

| Parameter | Unit | Apparatus present invention | Conventional apparatus |
|---|---|---|---|
| Interruptions in operation of the rotary kiln | — | None | Frequent |
| Load losses | — | As designed | Progressively increasing due to clogging of the catalytic bed |

The results of table 1 demonstrate how the apparatus and the process object of the present invention allow the efficiency of the SCR treatment system to also be improved with respect to an analogous treatment inserted in a conventional clinker production plant.

The results also show how the apparatus of the present invention is characterized by an excellent regularity of operation and by low energy consumption associated with the cleaning of the catalyst.

Finally, it is worth noting that a modest dust removal of the combustion fumes by means of the electrofilter (up to concentrations of the order of a gram) is sufficient to obtain a substantial increase in efficiency of the SCR device.

The invention claimed is:

1. Process for purifying a flow of combustion fumes from a clinker production plant comprising the following operating steps:
  a) removing dust from a flow of combustion fumes at a temperature comprised between 250 and 340° C. from a rotary kiln by passing said combustion fumes to a multistage preheater and then directly passing said flow of combustion fumes to an electrofilter with formation of a flow of combustion fumes free of dust;
  b) passing the flow of combustion fumes free of dust from step (a) directly to a selective catalytic reducer and carrying out on said flow of combustion fumes free of dust a selective catalytic $NO_x$ reduction treatment with ammonia, with formation of a purified flow of combustion fumes;
  c) recovering heat from said purified flow of combustion fumes by means of at least one heat exchanger or a conditioning tower; and
  d) submitting the purified flow of combustion fumes obtained from said at least one heat exchanger or conditioning tower to a further pollutant removal treatment by a step comprising a lowering treatment of sulphur oxides present in the purified flow of combustion fumes which include $SO_2$ by injecting calcium oxide and/or calcium hydroxide based compounds in said purified flow of combustion fumes.

2. Process according to claim 1 wherein step a) is carried out at a temperature comprised in the 270-320° C. range.

3. Process according to claim 1 wherein the dust removal of step a) reduces the concentration of dust in the flow of combustion fumes free of dust to a value lower than 15 g/Nm³.

4. Process according to claim 1 wherein the dust removal of step a) is realized by means of electrostatic precipitation.

5. Process according to claim 1 wherein the dust removal of step a) reduces the concentration of dust in the flow of combustion fumes free of dust to a value lower than 10 g/Nm³.

6. Process according to claim 1 wherein the dust removal of step a) reduces the concentration of dust in the flow of combustion fumes free of dust to a value lower than 5 g/Nm³.

7. Process according to claim 1 wherein after the step comprising a lowering treatment of sulphur oxides present in the purified flow of combustion fumes which include $SO_2$ by injecting calcium oxide and/or calcium hydroxide based compounds in said purified flow of combustion fumes, a further step is carried out to recover heat from said purified flow of combustion fumes by means of at least one heat exchanger.

* * * * *